United States Patent
Yao et al.

(10) Patent No.: US 8,942,717 B2
(45) Date of Patent: Jan. 27, 2015

(54) LOAD BALANCING TECHNIQUES IN WIRELESS NETWORKS

(75) Inventors: Zongming Yao, Shanghai (CN); Lei Shen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 12/592,611

(22) Filed: Nov. 30, 2009

(65) Prior Publication Data

US 2011/0130149 A1  Jun. 2, 2011

(51) Int. Cl.
*H04W 72/00* (2009.01)
*H04W 4/00* (2009.01)
*H04W 48/12* (2009.01)
*H04W 84/12* (2009.01)

(52) U.S. Cl.
CPC .............. *H04W 48/12* (2013.01); *H04W 84/12* (2013.01)
USPC .......................... 455/453; 455/456.1; 370/329

(58) Field of Classification Search
CPC ...... H04W 36/22; H04W 36/36; H04W 36/30
USPC ........... 370/329, 338, 331; 455/453, 436, 561
See application file for complete search history.

(56) References Cited

U.S. PATENT DOCUMENTS

| | | | |
|---|---|---|---|
| 5,724,665 A * | 3/1998 | Abbasi et al. | 455/561 |
| 2006/0166677 A1* | 7/2006 | Derakshan et al. | 455/453 |
| 2007/0140163 A1* | 6/2007 | Meier et al. | 370/329 |
| 2008/0102852 A1* | 5/2008 | Du et al. | 455/453 |
| 2009/0005052 A1* | 1/2009 | Abusch-Magder et al. | 455/446 |
| 2009/0028120 A1* | 1/2009 | Lee | 370/338 |
| 2009/0316649 A1* | 12/2009 | Chen | 370/331 |
| 2010/0173631 A1* | 7/2010 | Kim et al. | 455/436 |

\* cited by examiner

*Primary Examiner* — Jinsong Hu
*Assistant Examiner* — William Nealon
(74) *Attorney, Agent, or Firm* — Sutherland Asbill & Brennan LLP

(57) ABSTRACT

Techniques are described that provide load balancing in wireless networks. For instance, a device (e.g., a first access point) may receive one or more current operational characteristics for each of one or more neighbor APs. Also, the first AP may determine a received signal strength for each of these neighbor AP(s). In turn, the first AP selects one or more reportable neighbor APs from these neighbor APs. Further, the first AP transmits a beacon. This beacon includes, for each reportable neighbor AP, the corresponding one or more current operational characteristics and the corresponding received signal strength.

18 Claims, 6 Drawing Sheets

LOAD BALANCING TECHNIQUES IN WIRELESS NETWORKS

BACKGROUND

Wireless networks are becoming increasingly common. Many networks, such as IEEE 802.11 wireless local area networks (WLANs), involve access points (APs) that provide mobile connectivity to wireless client devices (also referred to as stations (STAs)). WLANs may operate in various modes. One such mode is the infrastructure mode, in which access points provide wireless client devices with connectivity to wired networks (e.g., Ethernet LANs). This mode allows client devices to access resources, such as the internet, printers, and so forth.

WLANs are used to provide cordless communications access in a variety of settings. Such settings include private home networks, enterprise networks, and publicly accessible networks (e.g., through wireless "Hot-Spots"). Current growth in the deployment and demand for wireless networks brings the need to apply load balancing. Load balancing involves techniques that manage communications demands across neighboring access points.

According to existing WLAN load balancing techniques, a client device first establishes a connection with an access point. After this connection is established, the client device may request (from its connected access point) a report of neighbor access points. This report provides information based on radio measurements. From the report, the client device may attempt to re-associate with one of the neighbor access points.

Unfortunately, such existing techniques may cause undue delays and excessive energy consumption by wireless devices.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide load balancing techniques in wireless networks. For instance, a device (e.g., a first access point) may receive one or more current operational characteristics for each of one or more neighbor APs. Also, the first AP may determine a received signal strength and the current operational characteristics for each of these neighbor AP(s). In turn, the first AP selects one or more reportable neighbor APs from these neighbor APs. Further, the first AP transmits a beacon. This beacon includes, for each reportable neighbor AP, the corresponding one or more current operational characteristics and the corresponding received signal strength.

Thus, in the context of IEEE 802.11 WLANs, embodiments provide mechanisms for low-power client-driven load balancing by using both IEEE 802.11k measurement results and beacons. As a result, improvements in enterprise WLAN performance and user experiences may be achieved.

Figure 1:
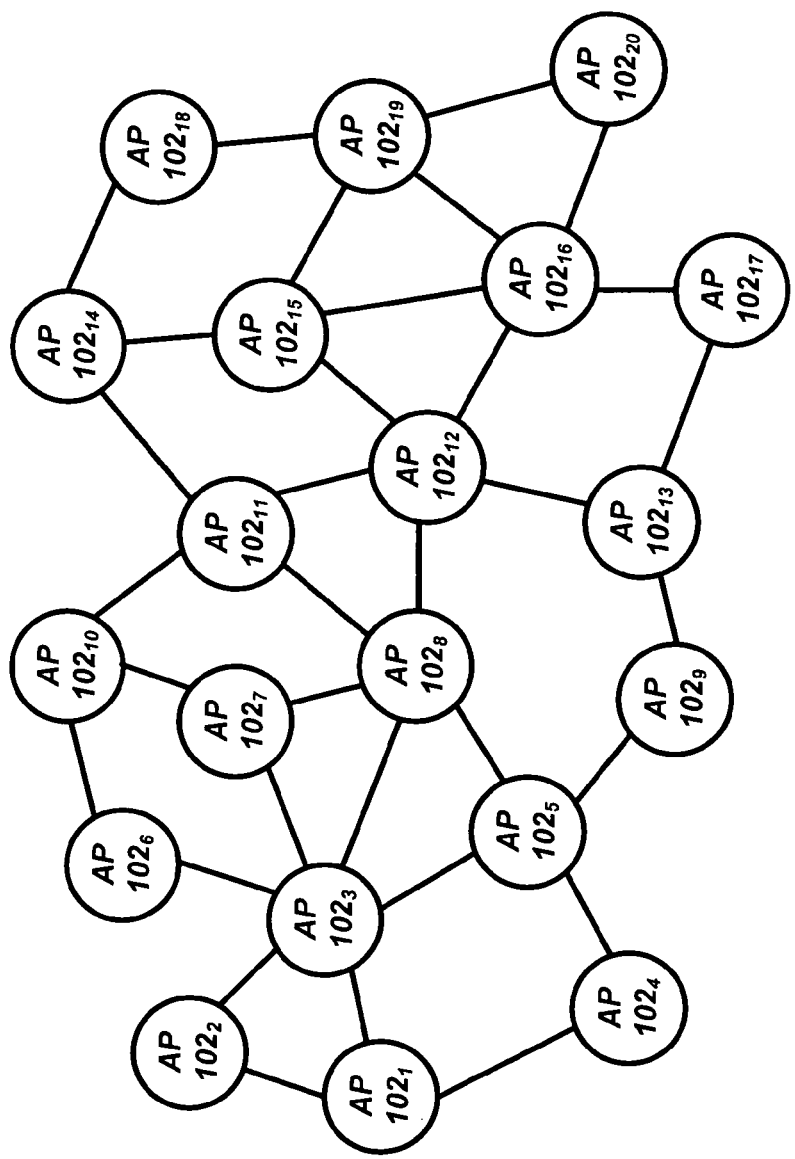
FIG. 1 is a diagram of an exemplary arrangement of access points.

FIG. 1 is a diagram of an exemplary arrangement of access points. In particular, FIG. 1 shows access points $102_1$-$102_{20}$. In this diagram, connecting lines show that each of these access points has one or more neighbor access points. For example, access point $102_5$ has neighbor access points $102_3$, $102_4$, $102_8$, and $102_9$. Similarly, access point $102_{14}$ has neighbor access points $102_{11}$ $102_{15}$ and $102_{18}$. Such neighbor relationships may be based on the wireless communicating range of particular access points. For instance, a neighbor relationship may exist between two access points when they can successfully send wireless transmissions to each other.

Thus, FIG. 1 provides a neighbor graph that is typical for many network environments, such as an enterprise WLAN deployment. In embodiments, this neighbor graph may be developed from signal measurement results performed by each AP in the network. Also, this neighbor graph may dynamically change due to the changes in the network environment. Examples of such network environment changes include (but are not limited to) channel reassignment of access points by a WLAN controller (not shown), changes in the radio frequency (RF) propagation environment, and so forth.

IEEE 802.11k is an amendment to the IEEE 802.11 wireless standard that permits radio resource measurement of WLANs. This amendment provides mechanisms for clients to obtain neighbor AP measurements. For example, in the context of FIG. 1, if a client device is currently associated with access point $102_8$, current IEEE 802.11k Neighbor Report messages allow the client to receive information regarding neighbor access points $102_5$, $102_7$ and $102_{12}$. From this information, the client may re-associate with one of the neighbor access points (e.g., when the client-driven load balancing is enabled in the network). Unfortunately, the current approach for delivering these neighbor report messages (described below with reference to FIG. 2) is an involved process that can cause excessive delay and energy consumption.

Figure 2:
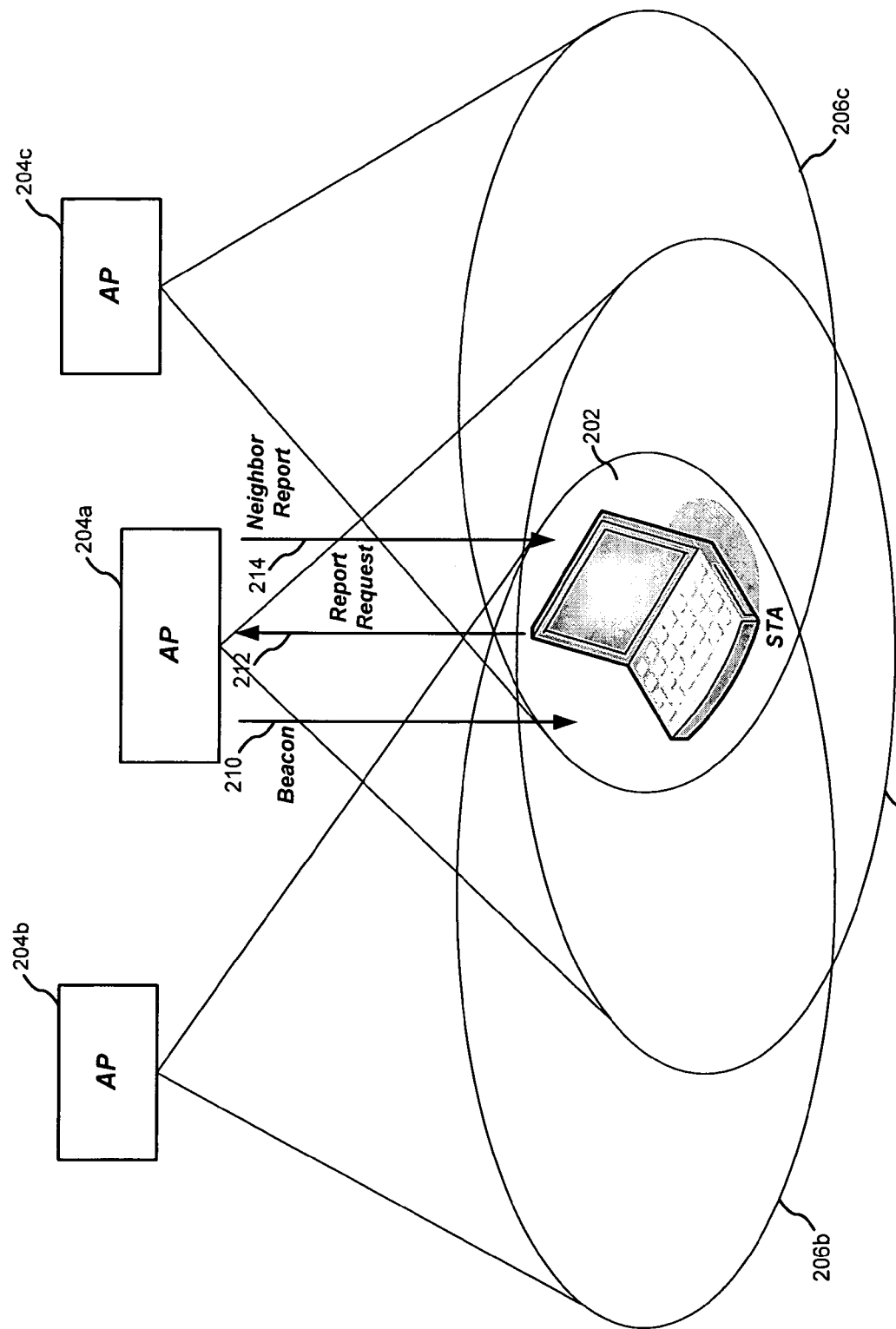
FIG. 2 is a diagram of an existing load balancing technique.

FIG. 2 is a diagram showing a current load balancing technique in accordance with IEEE 802.11k. This diagram shows a client device (STA) 202 that is currently associated with an AP 204a. FIG. 2 further shows AP 204a having a first neighbor AP 204b, and a second neighbor AP 204c. In addition, FIG. 2 shows APs 204a-c providing wireless coverage areas 206a-c, respectively. Thus, client device 202 may associate with any one of APs 204a-c.

In FIG. 2, interactions between devices are illustrated by arrows. For example, at an interaction 210, AP 204a broadcasts a beacon frame, which indicates that it has a high load (e.g., AP 204a is supporting a large number of client devices). Following this, an interaction 212 occurs in which STA 202 sends a neighbor report request message to AP 204a that requests a list of preferred nearby APs before it roams away.

In response, AP 204a sends a neighbor report message at an interaction 214. This message includes information regarding the neighbor APs of AP 204a (e.g., AP 204b and AP 204c). For instance, the neighbor report message includes received signal strength indicators (RSSIs) and available capacity information for each of these neighbor APs.

Based on this information, STA 202 may determine whether it should reassociate with one of APs 204b and 204c. In this particular example, STA 202 determines to reassociate with AP 204b. For instance, STA 202 may tune to the channel employed by AP 204b and seek to re-associate with it. This re-association may involve the exchange of one or more messages between STA 202 and AP 204b.

The load balancing technique of FIG. 2 has several drawbacks. For instance, this technique requires a client device to first set up a connection with an AP. Only at this point can the client device request the neighbor report message from its associated AP. Further, the neighbor report message is provided in response to a request from the client device. Unfortunately, these characteristics cause latencies. For example, such latencies may be between approximately 15 and 20 milliseconds. This is a considerable amount of time for high quality of service (QoS) applications, such as voice over IP (VoIP), video conferencing, and so forth. Thus, the techniques of FIG. 2 may impede performance and may limit future advanced deployments.

To overcome such drawbacks, embodiments provide techniques that deliver neighbor AP information more effectively. For instance, embodiments provide neighbor AP information elements that encapsulate 802.11k measurement results. Also, embodiments employ beacons to broadcast the Neighbor AP information elements.

Operations for embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. Embodiments are not limited to this context.

Figure 3:
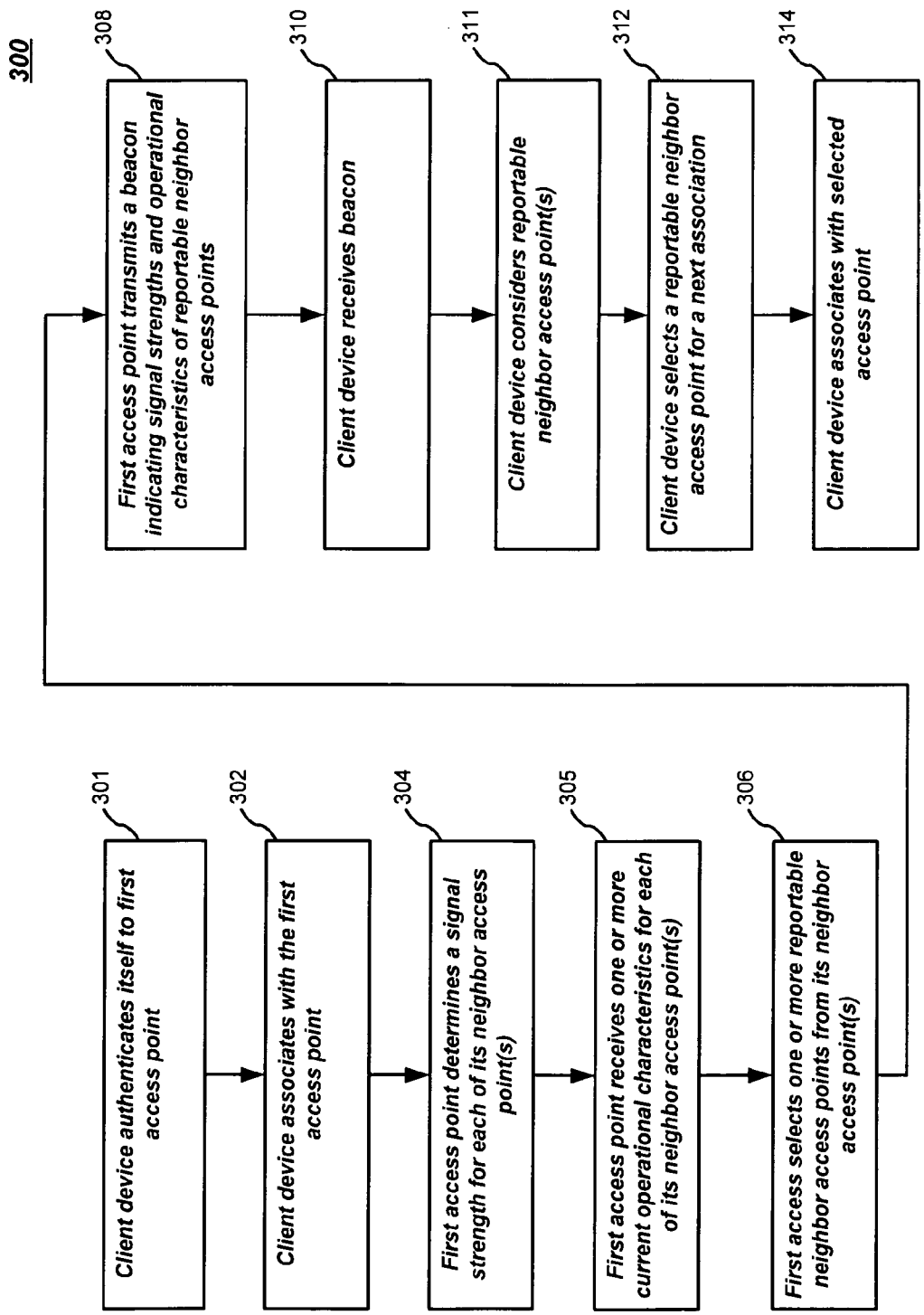
FIG. 3 is a flow diagram of an exemplary operation.

FIG. 3 is a diagram of a logic flow 300, which may be representative of the operations executed by one or more embodiments described herein. Although FIG. 3 shows a particular sequence, other sequences may be employed. Also, the depicted operations may be performed in various parallel and/or sequential combinations.

This logic flow is described in the context of a client device, and a first access point (such an access point of FIG. 1) having multiple neighbor APs. Embodiments, however, are not limited to this context.

At a block 301, the client device authenticates itself to the first access point.

Following this authentication, the client device associates with the first access point at a block 302. This association allows for frames to be properly delivered to the client device. Typically, a client device is only allowed to associate with one access point at a time. In embodiments, associating with an access point may involve multiple steps. For instance, after authenticating itself, the client device may send an Association Request message to the access point. The access point then receives and processes the Association Request message to determine whether the client device's request should be granted. If granted, the access point transmits a response having a successful status code and an Association ID (AID). Embodiments, however, are not limited to this exemplary process.

At a block 304, the first access point determines a signal strength for each of its neighbor access point(s). Accordingly, block 304 may involve the first access point performing measurements on one or more transmissions received from each neighbor access point. Upon determining such signal strengths and current operational characteristics (received at block 305), the first access point may represent them in the form of factors such as received signal strength indicators (RSSIs), channel utilization, station count, available admission capacity, etc. However, other representations may be employed.

At a block 305, the first access point receives one or more current operational characteristics for each of the neighbor access point(s). Such current operational characteristics may indicate available capacity for each of the neighbor access point(s). In embodiments, such operational characteristics may be received in the form of one or more messages sent by the neighbor access points. Moreover, within such messages, the operational characteristics may be formatted in one or more information elements (IEs).

Examples of current operational characteristics received at block 305 include (but are not limited to) a media access control (MAC) address of the neighbor access point, whether the neighbor access point can be reached by the client device through wireless transmissions, a frequency channel currently employed by the neighbor access point, the number of stations (client devices) currently associated with the neighbor access point, the amount of time the neighbor access point sensed that its medium (its currently employed channel) was busy, and/or the remaining amount of available medium time that the neighbor access point has via explicit admission control.

At a block 306, the first access point selects, from its neighbor access points, one or more reportable neighbor access points. These reportable neighbor access point(s) are for the first access point to report corresponding information in a beacon transmission. This selection may be based on one or more factors. Exemplary factors include (but are not limited to) the relative signal strength and/or available capacity of each neighbor access point.

For example, the first access point may rank the neighbor access points according to a metric that is based on signal strength and/or available capacity (as indicated by the neighbor AP-provided operational characteristics). From this ranking, the first access point may select a predetermined number of neighbor access points (e.g., five neighbor access points).

At a block 308, the first access point transmits a beacon transmission. The beacon transmission may include signal strengths and operational characteristics obtained at blocks 304 and 305. In embodiments, this information may be provided in one or more IEs. For instance, the beacon transmission may include an IE for each of the reportable neighbor access points. As an example, such IEs may be formatted as neighbor IEs, which are described below with reference to FIG. 4. Embodiments, however, are not limited to this IE format.

In addition to including operational characteristics of neighbor APs, the beacon transmission may include one or more current operational characteristics of the first access point. Examples of such characteristics include (but are not limited to) a media access control (MAC) address of the first access point, whether the first access point can be reached by the client device through wireless transmissions, a frequency channel currently employed by the first access point, the number of stations (client devices) currently associated with the first access point, the amount of time the first access point sensed that its medium (its currently employed channel) was busy, and/or the remaining amount of available medium time that the first access point has via explicit admission control.

This information regarding the first access point may be provided in an IE, such as an IEEE 802.11 QBSS Load IE. The QBSS Load IE provides various items of information. Examples of such information include a station count parameter that indicates the number of wireless stations currently associated with the access point, a channel utilization parameter that indicates the proportion of time the channel is busy, an available admission capacity parameter that indicates a remaining amount of channel time available (using explicit admission control). Embodiments, however, are not limited to this IE format.

At a block 310, the client device receives the beacon transmission from the first access point.

At a block 311, the client device considers the reportable neighbor access point(s). This may include considering information in the beacon transmission regarding these access point(s). Additionally or alternatively, this may involve the client device determining the signal strengths of transmission(s) and/or current operational characteristics from one or more of these reportable neighbor access point(s).

Based on this consideration, the client device selects (at a block 312) one of the reportable neighbor access point(s) for a next association. This selection may be based on information in the beacon transmission and/or signal strength(s) determined at block 310.

Accordingly, at a block 314, the client device associates with neighbor access point that it selected at block 312.

The flow of FIG. 3 illustrates the STA being associated with the first access point. However, the techniques of FIG. 3 may be employed without this association. For instance, in embodiments, the STA may determine its association from the beacon transmission without having an association with the first AP.

Figure 4:
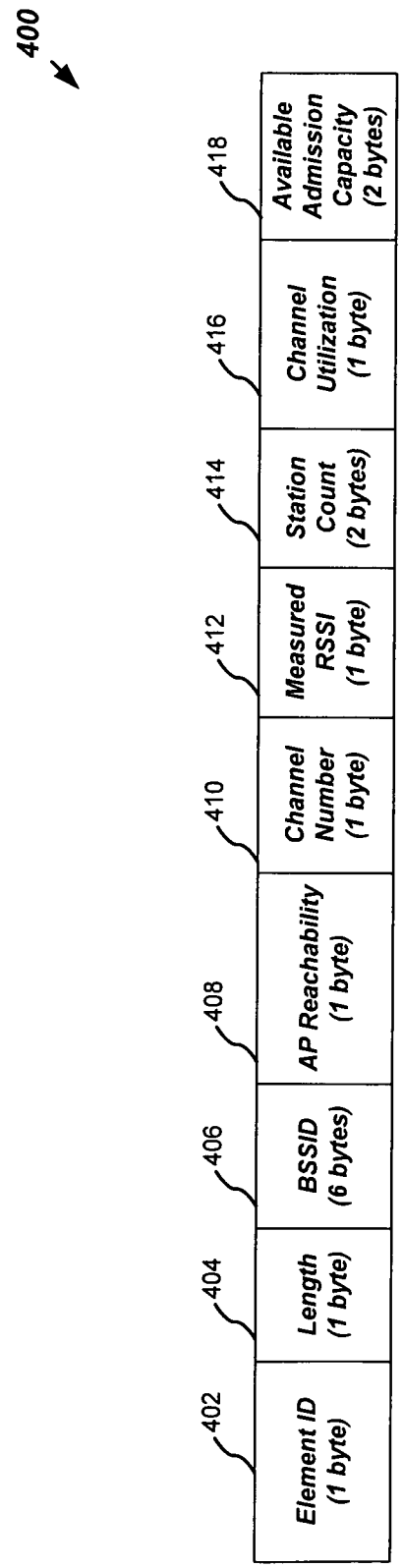
FIG. 4 is a diagram of an exemplary neighbor access point information element.

FIG. 4 is a diagram of an exemplary neighbor AP information element 400. As described above, it is helpful for a mobile station to select a QoS AP that is likely to accept future admission control requests. The Neighbor AP IE provides information that advantageously allows client devices to evaluate candidate access points based on both quality of service (QoS) and signal strength before determining the best candidate AP for reassociation (or association).

Neighbor AP IE 400 may include various fields. For example FIG. 4 shows an element ID field 402 that identifies information element 400 as a neighbor AP element, and a length field 404 that indicates the length (size) of the information element. Also, information element 400 includes a BSSID field 406 that indicates the media access control (MAC) address of the access point, and an AP reachability field 408 that represents whether this AP could be reached by the STA through wireless transmissions.

Further, a channel number field 410 indicates the frequency channel currently employed by the neighbor. A measured RSSI field 412 indicates a received signal strength indicator measurement for the neighbor AP, as measured by the reporting AP. A station count field 414 indicates the number of stations (client devices) that are currently associated with the neighbor AP.

A channel utilization field 416 indicates a proportion of time that the neighbor AP sensed that the medium (its currently employed channel) was busy.

An available admission capacity field 418 indicates the remaining amount of medium time that the neighbor AP has available via explicit admission control. In embodiments, this field may be an integer between 0 and 100 (thus providing a percentage).

In embodiments, a client device may use any combination of fields 412, 414, 416, and 418 as a basis for considering the neighbor AP. Embodiments, however, may consider neighbor APs based on additional and/or alternative factors.

Figure 5:
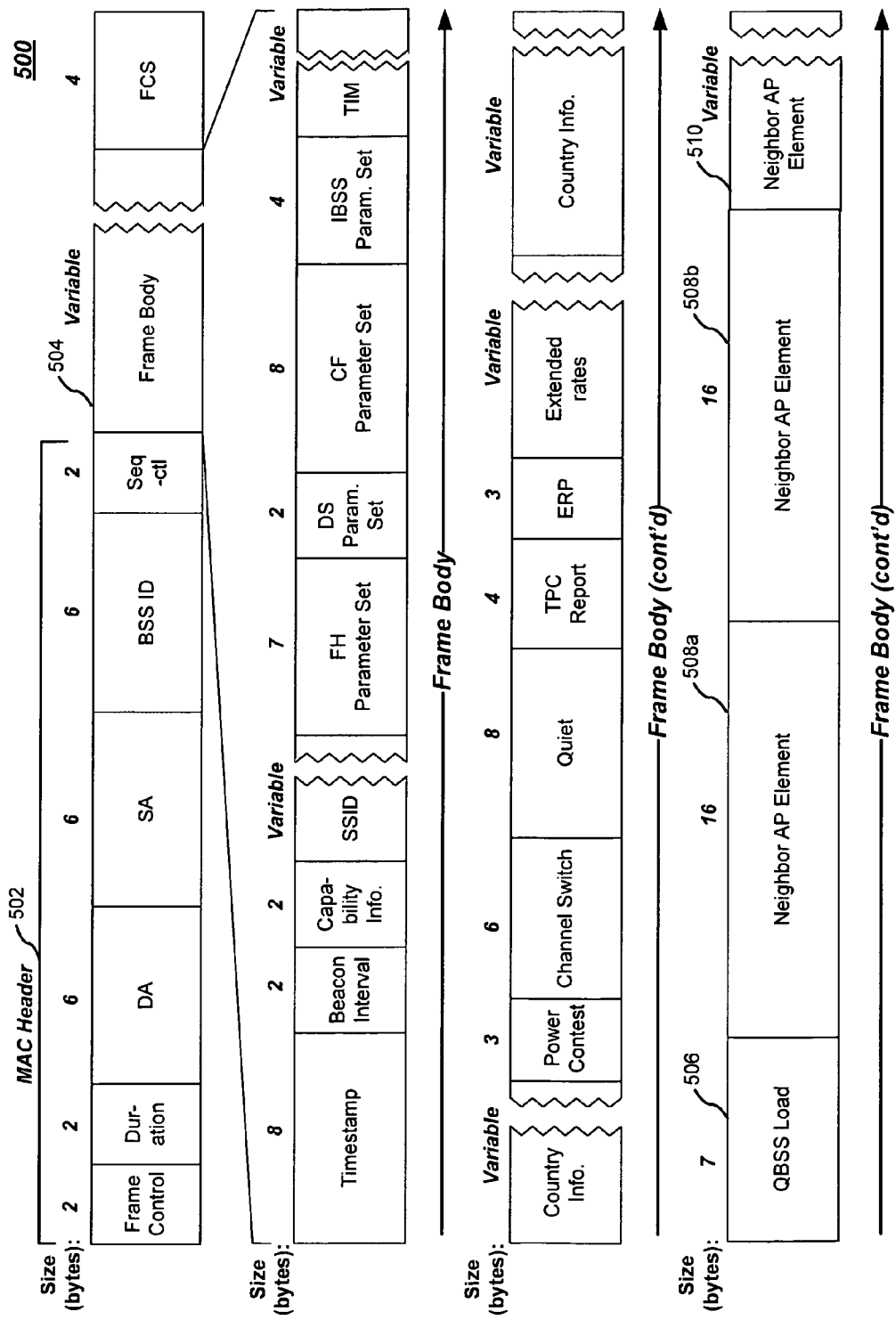
FIG. 5 is a diagram of an exemplary beacon frame format.

As described herein, embodiments provide techniques in which neighbor information is transmitted in beacons. FIG. 5 is a diagram showing a format of an exemplary beacon frame 500. This diagram is shown for purposes of illustration, and not limitation. Thus, other beacon frame formats may be employed.

As shown in FIG. 5, beacon frame 500 includes a MAC header portion 502 and a frame body portion 504. Further, FIG. 5 shows that frame body portion 504 includes several fields or IEs. For instance, frame body 504 includes a QBSS Load IE 506, a first Neighbor Report IE 508a, a second Neighbor Report IE 508b, and a remaining portion 510 that includes one or more subsequent Neighbor Report IEs. Embodiments, however, may include any number of Neighbor Report IEs. This may be based, for example, on the number of reportable neighbor access points (e.g., as determined at block 306 of FIG. 3).

Figure 6:
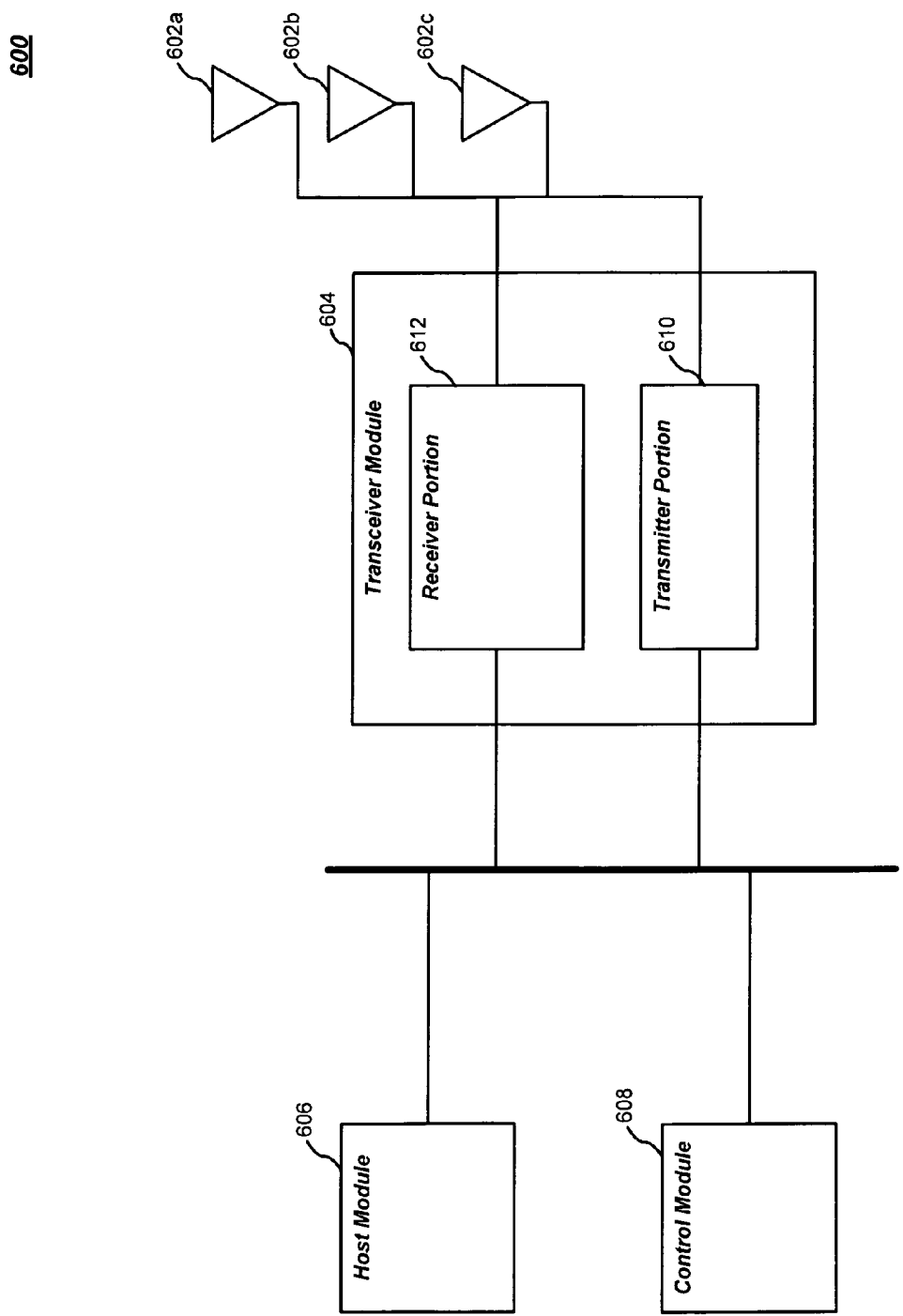
FIG. 6 is a diagram of an implementation that may be employed in a wireless communications device.

FIG. 6 is a diagram of an exemplary implementation 600 that may employ the techniques described herein. This implementation may be included in a wireless device, such as APs and STAs of FIGS. 1 and 2. However, this implementation may be also employed in other contexts.

Implementation 600 may include various elements. For example, FIG. 6 shows implementation 600 including multiple antennas 602a-c, a transceiver module 604, a host module 606, and a control module 608. These elements may be implemented in hardware, software, or any combination thereof.

Antennas 602a-c provide for the exchange of wireless signals with remote devices. Although three antennas are depicted, any number of antennas may be employed. Also, embodiments may employ one or more transmit antennas and one or more receive antennas. Such multiple antenna arrangements may be employed for beamforming and/or the employment of multiple spatial streams with a remote device.

As shown in FIG. 6, transceiver module 604 includes a transmitter portion 610, and a receiver portion 612. During operation, transceiver module 604 provides an interface between antennas 602a-c and other elements, such as host module 606, and control module 608. For instance, transmitter portion 610 receives symbols from such elements, and generates corresponding signals for wireless transmission by one or more of antennas 602a-c. This may involve operations, such as modulation, amplification, and/or filtering. However, other operations may be employed.

Conversely, receiver portion 612 obtains signals received by one or more of antennas 602a-c and generates corresponding symbols. In turn, these symbols may be provided to elements, such as host module 606, packet failure analysis module 607, and/or retransmission management module 608. This generation of symbols 626 may involve operations, including (but not limited to) demodulation, amplification, and/or filtering.

The signals generated and received by transceiver module 604 may be in various formats. For instance, these signals may be modulated in accordance with an orthogonal frequency division multiplexing (OFDM) scheme. However, other schemes and formats (e.g., QPSK, BPSK, FSK, etc.) may be employed.

To provide such features, transmitter portion 610 and receiver portion 612 may each include various components, such as modulators, demodulators, amplifiers, filters, buffers, upconverters, and/or downconveters. Such components may be implemented in hardware (e.g., electronics), software, or any combination thereof.

The symbols exchanged between transceiver module 604 and other elements may form messages or information associated with one or more protocols, and/or with one or more user applications. Thus, these elements may perform operations corresponding to such protocol(s) and/or user application(s). Exemplary protocols include (but are not limited to) various media access control and discovery protocols. Exemplary user applications include telephony, messaging, e-mail, web browsing, content (e.g., video and audio) distribution/reception, and so forth.

Moreover, in transmitting signals, transceiver module 604 may employ various access techniques. For example, transceiver module 604 may employ a contention-based technique, such as CSMA, CSMA/CA, and so forth. Embodiments, however, are not limited to such techniques.

In embodiments, control module 608 may perform various operations described herein. For instance, when implemented within an AP, control module 608 may receive (through transceiver module 610) one or more current operational characteristics provided by neighbor APs.

Also, control module 610 may measure the strength of received signals. This may be performed through various signal processing techniques or algorithms. For example, received sequences may be correlated with stored sequences to provide a signal strength assessment. Other techniques may involve the processing of soft symbols received from transceiver module 604. Embodiments, however, are not limited to these exemplary techniques. Embodiments may employ such signal strength measurements may be performed when implemented in an AP or a client device.

Also, control module 610 may generate beacon frames, such as the types described herein. For example, control module 610 may generate beacon frames that include neighbor AP IEs and QBSS IEs.

Also, control module 610 may determine which of one or more neighbor APs are to be reportable neighbor APs, as described herein.

Moreover, control module 610 may process received beacon frames. For example, in the context of a client device, such processing may involve determining whether to associate with a reportable neighbor AP.

Host module 606 may exchange symbols with transceiver module 504 that correspond to wireless signals exchanged with remote devices. These symbols may form messages or information associated with one or more protocols, and/or one or more user applications. Thus, host module 606 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For example, the techniques described herein are not limited to IEEE 802.11 networks. For example, these techniques may be employed in other networks including (but not limited to) IEEE 802.16 networks and IEEE 802.21 networks.

Moreover, the techniques described herein are not limited to the context of communications between a station and an access point. Thus, these techniques may be employed in various peer-to-peer contexts.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
   at a first access point (AP), receiving one or more current operational characteristics for each of one or more neighbor APs from the one or more neighbor APs;
   determining, by the first AP, a received signal strength for each of the one more neighbor APs;
   selecting, by the first AP, a predetermined number of one or more reportable neighbor APs from the one or more neighbor APs for transmission in a beacon, the reportable neighbor APs selected from the neighbor APs based on the one or more current operational characteristics received by the first AP from each of the one or more neighbor APs;
   transmitting, by the first AP to a client device, a beacon transmission, wherein the beacon transmission announces an availability of the corresponding selected predetermined number of one or more reportable neighbor APs, wherein the beacon transmission includes for each of the one or more reportable neighbor APs, the corresponding one or more current operational characteristics received by the first AP from each of the one or more reportable neighbor APs, and the corresponding received signal strength; and
   in response to transmitting the beacon transmission to the client device, receiving, by the first AP from the predetermined number of one or more reportable neighbor APs, an indication that the client device performed an initial association with one of the predetermined number of one or more reportable neighbor APs.

2. The method of claim 1, wherein the one or more operational characteristics for each of the one or more neighbor APs indicates available capacity for each of the one or more neighbor APs.

3. The method of claim 1, wherein, the one or more operational characteristics for each of the one or more neighbor APs includes any combination of:
   a frequency channel currently employed by the neighbor AP,
   a number of stations currently associated with the neighbor AP,
   an amount of time the neighbor AP sensed that its medium was busy, and
   a remaining amount of available medium time that the neighbor AP has via explicit admission control.

4. The method of claim 1, wherein the beacon transmission further includes one or more current operational characteristics regarding the current AP.

5. The method of claim 3, wherein the beacon transmission provides the one or more current operational characteristics regarding the current AP in a QBSS Load Information Element (IE).

6. The method of claim 1, further comprising ranking the one or more reportable neighbor APs based at least on the received signal strength or available capacity of each of the one or more neighbor APs.

7. The method of claim 1, receiving the beacon transmission at the client device; and
   wherein the client device selects the one of the one or more reportable neighbor APs based at least in part on the beacon transmission.

8. The method of claim 1, wherein selecting the AP association comprises selecting the one of the predetermined number of reportable neighbor APs.

9. The method of claim 8, wherein the client device measures a received signal strength for at least one of the reportable neighbor APs.

10. An apparatus, comprising:
   a transceiver module to receive transmissions from one or more neighbor access points, the transmissions including one or more current operational characteristics for each of one or more neighbor APs; and
   a control module, the control module to:
      determine a received signal strength of each of the one or more neighbor access points,
      select a predetermined number of reportable neighbor APs from the one or more neighbor APs, the reportable neighbor APs based on the operational characteristics of each of the one or more neighbor APs; and
      generate a beacon frame having, for the predetermined number of the reportable neighbor APs, the one or more corresponding current operational characteristics and the corresponding received signal strength;
   wherein the transceiver module is to transmit the beacon frame to a client device, wherein the beacon transmission announces an availability of the corresponding selected predetermined number of reportable neighbor APs; and
   wherein in response to transmitting the beacon frame to the client device, the transceiver module is to receive from the predetermined number of reportable neighbor APs, an indication that the client device performed an initial association with one or the predetermined number of reportable neighbor APs.

11. The apparatus of claim 10, wherein the control module is to determine which of the one or more neighbor APs to report in the beacon frame.

12. The apparatus of claim 11:
   wherein the control module is to determine which of the one or more neighbor APs to report in the beacon frame based on a metric; and
   wherein the metric is based at least on the received signal strength of each of the one or more neighbor APs.

13. The apparatus of claim 10:
   wherein the apparatus is included in a current AP; and
   wherein the beacon frame further includes one or more current operational characteristics regarding the current AP.

14. The apparatus of claim 13, wherein the one or more current operational characteristics regarding the current AP are included in a QBSS Load Information Element (IE).

15. The apparatus of claim 10, wherein the one or more operational characteristics for each of the one or more neighbor APs includes any combination of:
   a frequency channel currently employed by the neighbor AP,
   a number of stations currently associated with the neighbor AP,
   an amount of time the neighbor AP sensed that its medium was busy, and
   a remaining amount of available medium time that the neighbor AP has via explicit admission control.

16. An article comprising a machine-accessible non-transitory storage medium having stored thereon instructions that, when executed by a machine, cause the machine to:
   receive one or more current operational characteristics for each of one or more neighbor APs;
   determine a received signal strength for each of the one more neighbor APs;
   select a predetermined number of one or more reportable neighbor APs from the one or more neighbor APs for transmission in a beacon, the reportable neighbor APs selected based on the one or more current operational characteristics received by the first AP from each of the one or more neighbor APs; and
   transmit a beacon transmission to a client device, wherein the beacon transmission includes for each of the one or more reportable neighbor APs, the corresponding one or more current operational characteristics and the corresponding received signal strength, wherein the beacon transmission announces an availability of the corresponding selected predetermined number of one or more reportable neighbor APs; and
   in response to transmitting the beacon transmission to the client device, receive, from the predetermined number of one or more reportable neighbor APs, an indication that the client device performed an initial association with one of the predetermined number of one or more reportable neighbor APs.

17. The method of claim 1, wherein the one or more current operational characteristics received by the first AP from each of the one or more neighbor AP comprises one or more of a received signal strength indicator, channel utilization, station count, or available admission capacity.

18. The method of claim 1, wherein the predetermined number of one or more reportable neighbor APs is at least two.

* * * * *